US00RE42095E

(19) United States
(12) Reissued Patent
Koeppen et al.

(10) Patent Number: US RE42,095 E
(45) Date of Reissued Patent: *Feb. 1, 2011

(54) METHOD FOR TRANSFERRING UTILITY OPTICAL SIGNALS AND OPTICAL-LINE NETWORK

(75) Inventors: Jan Koeppen, Karlsbad (DE); Guenter Neumann, Bad Salzdetfurth (DE); Helmut Tiltmann, Dortmund (DE)

(73) Assignee: Nola Semiconductor LLC, Las Vegas, NV (US)

( * ) Notice: This patent is subject to a terminal disclaimer.

(21) Appl. No.: 11/902,368
(22) PCT Filed: Sep. 30, 1998
(86) PCT No.: PCT/DE98/02885
§ 371 (c)(1),
(2), (4) Date: Nov. 28, 2000

(87) PCT Pub. No.: WO99/43106

PCT Pub. Date: Aug. 26, 1999

Related U.S. Patent Documents

Reissue of:
(64) Patent No.: 6,947,668
Issued: Sep. 20, 2005
Appl. No.: 09/622,652
Filed: Nov. 28, 2000

(30) Foreign Application Priority Data

Feb. 20, 1998 (DE) ..... 198 07 069

(51) Int. Cl.
*H04B 10/08* (2006.01)

(52) U.S. Cl. ..... 398/16; 398/3; 398/5; 398/12; 398/19; 398/20; 398/30; 398/33; 398/177; 398/135; 398/31; 398/45; 398/50; 398/56; 398/82; 398/139; 398/140; 398/141; 370/223; 370/227; 370/228; 370/243; 370/247

(58) Field of Classification Search ..... 398/1, 398/2, 3, 5, 7, 8, 45, 46, 47, 48, 50, 52, 53, 398/55, 56, 59, 79, 83, 135, 13, 16, 17, 20, 398/25, 26, 27, 30, 31, 33, 38, 177, 10, 12, 398/14, 19, 22, 23, 24, 140, 141, 139, 82, 398/9; 370/223, 227, 228, 243, 247, 248
See application file for complete search history.

(56) References Cited

U.S. PATENT DOCUMENTS 5,663,820 A 9/1997 Shiragaki (Continued)

FOREIGN PATENT DOCUMENTS

EP 0 440 276 8/1991

(Continued)

OTHER PUBLICATIONS

M. Bischoff et al., "Operation and Maintenance for an All–Optical Transport Network," IEEE Communications Magazine, vol. 34, No. 11, pp. 135–142 (Nov. 1996).

*Primary Examiner*—Hanh Phan
(74) *Attorney, Agent, or Firm*—Connolly Bove Lodge & Hutz LLP

(57) ABSTRACT

The control of the transmission of useful optical signals on different line paths of an optical transmission device is accomplished via at least one of the following features: using signal sources and signal sinks, the useful optical signals are coupled into the line paths, or are coupled out of them; at least one portion of the optical line paths is configured as normal line paths having coupling nodes via which a switchover to an alternative line path can be undertaken if a normal line path is disturbed; in addition to the useful optical signals, test signals, whose evaluation is used for the switchover between the line paths, are transmitted bidirectionally section-by-section; at least two types of test signals can be transmitted, of which a first type is used as an indicator for an intact line path and a second type as an indicator for a disturbed line path; and any switchover to an alternative line path is only undertaken if, before the detection of the disturbance, a test signal of the first type has been transmitted on the normal line path. A decentralized switchover of the line paths is provided and pointless switchovers, which do not lead to any improvements in the transmission, can be avoided.

36 Claims, 4 Drawing Sheets

U.S. PATENT DOCUMENTS

| | | | | | |
|---|---|---|---|---|---|
| 5,870,212 | A | * | 2/1999 | Nathan et al. | 398/4 |
| 5,905,585 | A | * | 5/1999 | Shirai | 398/20 |
| 5,986,783 | A | * | 11/1999 | Sharma et al. | 398/59 |
| 6,005,694 | A | * | 12/1999 | Liu | 398/6 |
| 6,160,648 | A | * | 12/2000 | Oberg et al. | 398/4 |
| 6,583,898 | B1 | * | 6/2003 | Koeppen et al. | 398/13 |

FOREIGN PATENT DOCUMENTS

| | | |
|---|---|---|
| EP | 0 721 275 | 7/1996 |
| WO | 97 09803 | 3/1997 |
| WO | 97 24822 | 7/1997 |

* cited by examiner

METHOD FOR TRANSFERRING UTILITY OPTICAL SIGNALS AND OPTICAL-LINE NETWORK

Matter enclosed in heavy brackets [ ] appears in the original patent but forms no part of this reissue specification; matter printed in italics indicates the additions made by reissue.

FIELD OF THE INVENTION

The present invention relates to a method for transmitting useful optical signals in an optical transmission device having optical line paths and relates to an optical network.

BACKGROUND INFORMATION

Optical glass fiber lines have proven to be particularly suitable for the low-loss transmission of information having high information density. Usually information signals in electrical form are converted into optical signals, for example, using light-emitting diodes or laser diodes, and they are coupled into a corresponding optical fiber-optic line. At appropriate locations in the network, the signal is detected, for example, using a photodiode and is once again converted into an electrical signal, such as can be further processed in the customary manner. This signal transmission is well suited for overcoming large distances. At suitable intervals in the appropriate lines, amplifiers and/or regenerators are inserted, which are designed to assure that the signal arrives at the signal sink configured, for example, by the photodiode in an easily receivable form. Just as in the case of electrical networks, it is necessary to provide nodes, through which signals are conveyed to a specific desired receiver and as a result of which it is possible to provide an alternative path for a main line path in the event that the transmission on the main line path is disturbed. As a result of appropriately provided bytes in an overhead of the useful signal to be transmitted, it is also possible to undertake automatic alternative line switching operations. One disadvantage in this method is that the switching operation of an alternative path is only possible within an established transmission standard for the useful signals and that, in a conventional system, an optoelectronic conversion of the signal is necessary at the ends of the segment that is protected by an alternative path. These ends do not necessarily coincide with the sources/sinks of the useful signals.

European Patent No. 0 440 276 describes adding, outside of the useful signal band, a communication signal, using optical couplers. As a result, control and command signals can be transmitted between the nodes of the transmission device. Whereas the transmission of useful signals takes place in the so-called "third window," the "second window" has been provided for the transmission of communications signals. The "windows" arise from from the damping characteristics of the glass fiber material for certain wavelength ranges. In the "third window," the damping is minimal, whereas the "second window" is formed using a different damping minimum, in which the lower damping values of the "third window" are not attained. For service communications on the line network, a dedicated transmission band is therefore made available.

SUMMARY OF THE INVENTION

The present invention provides for transmitting bidirectional test signals on the line paths, connected to each other, of an optical path between signal source and sink and, if appropriate, on individual line segments of the line paths, the reception or non-reception of the test signals being evaluated as an indicator for a line disturbance on a line segment. By forestalling the transmission of the test signal in the opposite direction, it is possible to initiate an alarm upstream in the transmission direction or to trigger a switchover of a node to an alternative path. The decentralized switchover to alternative paths, made possible in this manner, can be carried out orders of magnitude faster than is the case via a centralized control system. This advantage, however, is linked to the problem that even slight and predictable disturbances trigger switchover operations and, as a result, activate alternative paths that are not necessary or not helpful, so that the alternative paths may be used for a communication having lower priority or as a protective measure for a different normal line path, for example. In particular, there is nothing to prevent switchover operations from taking place on an optical path that, in any case, is no longer usable due to a detected disturbance, so that unnecessary switchover operations and unnecessary occupations of alternative paths occur.

The present invention is based, at least in part, on the general problem of making possible a rapid switchover to alternative line paths, while at the same time avoiding pointless switchover operations. For solving this problem, according to the present invention, a method for optical transmission includes at least one of the following features:

- using signal sources and signal sinks, the useful optical signals are coupled into the line paths, or are coupled out of them;
- at least one portion of the optical line paths is configured as normal line paths having coupling nodes, via which a switchover to an alternative line path can be undertaken if a normal line path is disturbed;
- in addition to the useful optical signals, test signals, whose evaluation is used for the switchover between the line paths, are transmitted bidirectionally section-by-section;
- at least two types of test signals can be transmitted, of which a first type is used as an indicator for an intact line path and a second type as an indicator for a disturbed line path, and
- any switchover to an alternative line path is only undertaken if, before the detection of the disturbance, a test signal of the first type has been transmitted on the normal line path.

The method according to the present invention provides that test signals of at least two types are generated and that the switchover depends not only on the absence of a test signal—as an indicator of the disturbance—but rather on the type of test signal previously received. In this manner, the present invention makes it possible in a controlled manner to avoid switchover operations, as result of the fact that test signals of the second type are transmitted over a line path, because these test signals of the second type suppress protective measures such as switchovers on the line path. As result of the transmission of a test signal of the second type, it is possible, for example, to prevent switchover operations in an optical path which, on the basis of an already detected disturbance, is currently no longer usable. In addition, the present invention makes it possible to undertake the supplying of the test signal of the second type from a superordinate control system and, for predictable disturbance events, for example, transit a further useful signal channel in the network, to avoid interference signals that are brought about in the present useful signal channels and that experience shows are short-term.

The present invention provides rapid, decentralized switchover by coupling nodes while simultaneously controlling for the sensibleness of a switchover of this type and also simultaneously avoiding pointless switchovers.

In order to carry out the present invention, test signal nodes are provided at the ends of each line segment, through which specific test signals are received, new test signals are formed and transmitted, or test signals are conveyed further.

In this context, consideration is given to the fact that the test signal nodes, depending on the prevailing configuration of an optical path, sometimes border a line segment that is simultaneously a test signal segment, and sometimes, within a test signal segment, are not supposed to exercise the function of influencing the test signals. In an exemplary embodiment according to the present invention, the test signal nodes are constructed so as to be substantially identical and, through software, are configured as transit nodes, inception nodes, or end nodes. In an end node, test signals in both transmission directions are received, evaluated, generated once again, and transmitted. An end node is located at a signal sink or signal source and is effective, from the point of view of the end node, for reception and transmission in one direction. A transit node does not alter the received test signals, but it can determine whether a test signal has not been received, since it, in this case, produces and transmits a particular test signal, for example, of the third type.

In order to avoid switchover operations on an optical path that is no longer usable due to a detected disturbance, in an exemplary embodiment according to the present invention, it is provided that, from a plurality of line paths connected to each other, one optical path between the two signal sources or sinks is formed and, in response to a detected disturbance on a line path, a test signal of the second type is transmitted on all other line paths of the optical path.

If the test signal nodes recognize a test signal of a third type, or if no test signal at all is received at the test signal node, then a switchover to an alternative line path is undertaken if a transition is detected from the test signal of the first type to the test signal of the third type.

The test signal nodes are connected via signals to a superordinate control system, which controls the configuration of the test signal nodes in the individual case. The superordinate control system can be configured in a decentralized manner by control systems of the coupling nodes located closest to the test signal node.

An application area of the present invention lies in communications networks, in which the transmission of useful optical signals takes place in a bidirectional manner, the transmission of the useful optical signals being able to take place over separate optical fiber optic lines in both transmission directions.

The test signals according to the present invention are transmitted together with the useful signals transmitted in the direction in question.

In general, a plurality of useful signals is transmitted on optical fiber lines in a multiplex operation, for example, in wavelength division multiplexing. In this context, each transmitted useful signal has assigned to it its own test signal and is transmitted in a separate test signal channel. The test signals are combined electrically in the time-division multiplex operation and are then optically added to the useful signals in wavelength division multiplexing. For solving the above-mentioned general problem, an optical network including at least one of the following features functions according to the present invention:

between optical signal sources/sinks, optical paths are arranged, the optical paths include line paths that are connected to each other, the line paths are connected to each other via coupling nodes, some of the line paths can be bypassed as normal line paths by a switchover from coupling nodes to alternative line paths, all line paths and, optionally, line segments making up a part of the line paths, are, in each case, bordered by test signal nodes, the test signal nodes have test signal receivers and test signal transmitters in both line directions, the test signal nodes are provided with a test signal generator and a control system of the test signal generator for generating at least two different types of test signals, as a function of the test signal received by the test signal receivers, and a control system for the coupling nodes is only set up for the switchover to an alternative line path when a disturbance of a normal line path can be detected in connection with a specific type of test signal.

In this context, the control system may be part of the corresponding coupling node.

The test signal nodes are preferably configured for transmitting three types of test signals and are able, at the test signal receivers, to detect four different states, namely, the reception of the three test signals and a non-reception of a test signal, in that, using a test signal detector, for example, the undershooting of a level of the test signal, or an insufficient edge steepness, or an entirely false test sum is detected as a disturbance and a corresponding disturbance recognition signal is generated. At the disturbance recognition signal, an alarm device can be triggered.

DETAILED DESCRIPTION

Figures 1A, 1B, 1C, 1D:
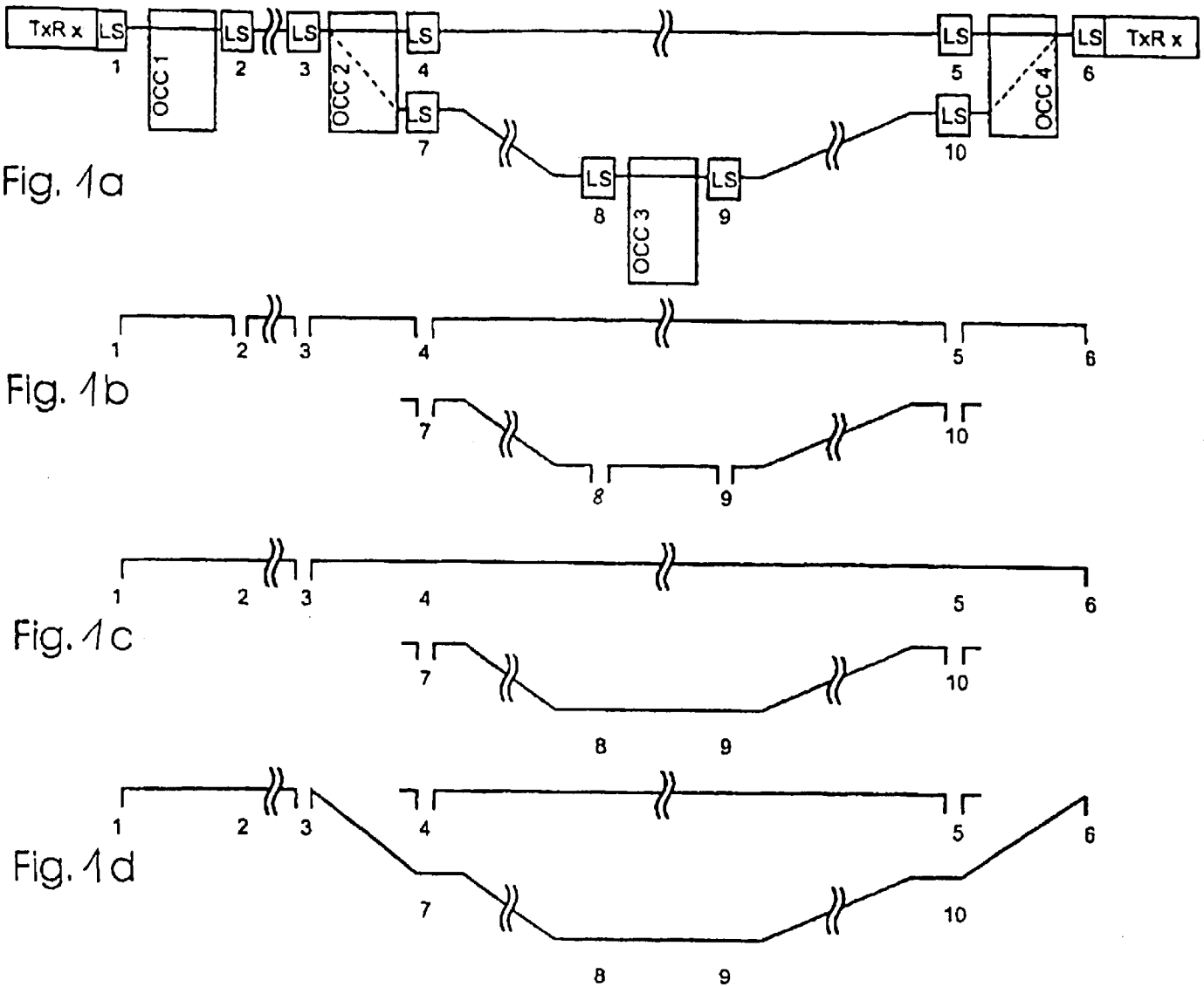
FIG. 1a depicts a schematic representation of a first embodiment of an optical path including a normal line path and an alternate line path according to the present invention.
FIG. 1b depicts optical line segments arising from the first embodiment according to the present invention.
FIG. 1c depicts a first configuration of test segments arising from the first embodiment according to the present invention.
FIG. 1d depicts a second configuration of the test segments arising from the first embodiment according to the present invention.

FIG. 1a depicts an exemplary embodiment for an optical path OP between two transmitters/receivers TxRx, each of which is connected to test signal nodes LS1, LS6 forming circuit points 1 and 6. First coupling node OCC1 is connected to transmitter/receiver TxRx at circuit point 1. With regard to the depicted optical path, first node OCC1, at its output facing away from circuit point 1, has a test signal node LS2 at circuit point 2. A line path 2-3 is connected, which terminates at circuit point 3 in a test signal node LS3. Connected to this is a second coupling node OCC2, which makes possible a branching and has two connections to line points 4 and 7, at which test signal nodes LS4 and LS7 are located. Line point 4, along with a distant line point 5, forms a normal line path 4-5, which at a test signal node LS5, ends in a subsequent fourth coupling node OCC4. This coupling node has a further connection to a line point 10 having a test signal node LS10, at which an alternative line path 7-10 ends. In the alternative line path, in the depicted exemplary embodiment, a third coupling node OCC3 is connected, which is provided on both sides at line points 8 and 9 with test signal nodes LS8, LS9.

The other end of fourth coupling node OCC4 is connected to transmitter/receiver TxRx, terminating the optical path in test signal node LS6.

FIG. 1b clarifies the optical line segments arising therefrom, 1-2, 2-3, 3-4, 4-5, 5-6, 7-8, 8-9, 9-10, the line segments between line points 7 and 10 forming an alternative line path for normal line path 4-5.

FIG. 1c makes clear that for monitoring this line configuration in the event of a functioning normal path 4-5, only three test segments 1-3, 3-6, 7-10 are necessary, so that test signal nodes LS2, LS4, LS5, LS8, and LS9 can be configured as transit nodes, which do not process a test signal but rather covey it further.

The test signal segments are formed according to the following rules:

- at all sources and sinks S/D of useful signals, a test signal segment always begins and ends
- at the beginning and ending of all passive transmission paths, a test signal segment always begins/ends
- at the beginning/ending of a normal line path protected by an alternative line path, a test signal segment always begins/ends. The optical segment in the node at the beginning/ending of a test signal segment constitutes one unit along with the test signal segment of the corresponding active transmission path.

All test signal nodes that are not required at the ending of a test signal segment are configured as transit nodes, i.e., the test signal is only conveyed further.

If the absence of a test signal LS is established on test segment 1-3, then no alternative path is available, so that an alarm is transmitted to a central network control system (Telecommunication Management Network). The user of the network control system reacts to the line failure.

On the other hand, if the test signal on normal line path 3-6 fails, coupling nodes OCC2 and OCC4 are induced to switch over and the test signal nodes are reconfigured, so that now test signal nodes LS4 and LS5 are configured as inception nodes for testing the repair of test segment 4-5, whereas test signal nodes LS7 and LS10, heretofore active as inception nodes, can be configured as transit nodes. Test segment 3-6 now forms the active alternative line path, whereas normal line path 4-5 is no longer used.

Figure 2A:
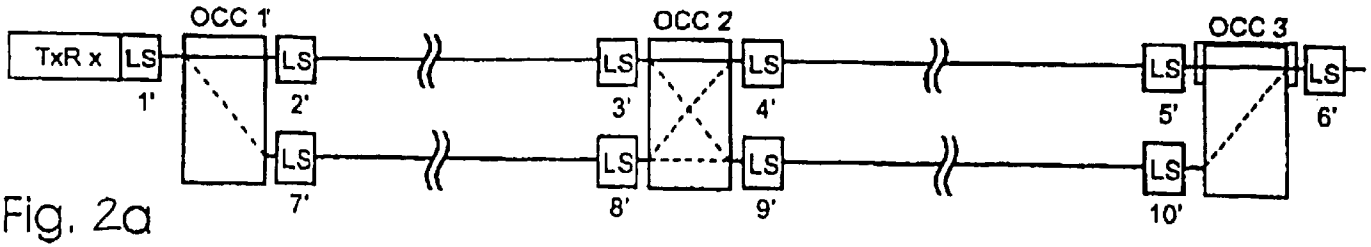
FIG. 2a depicts a schematic representation of a second embodiment of an optical path including a normal line path and an alternate line path according to the present invention.

FIG. 2a depicts another exemplary embodiment for an optical path OP between two transmitters/receivers TxRx having test signal nodes LS1', LS6' at line points 1', 6'. A first coupling node OCC1' forms a branching leading to two line points 2', 7' having corresponding test signal nodes LS2', LS7'. A second coupling node OCC2' is arranged as a crossing separating filler between normal line paths 1'-4', 3'-6' and alternative line paths 7'-8', 9'-10', and it has four connections to circuit points 3', 4', 8', 9' having test signal nodes LS3', LS4', LS8', LS9'.

A third coupling node OCC3' brings together at line point 6' the two line paths that arrive at line points 5', 10' having test signal nodes LS5', LS10'.

Figure 2B:
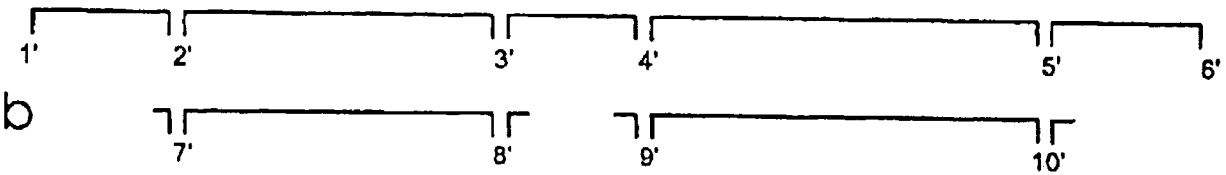
FIG. 2b depicts optical line segments arising from the second embodiment according to the present invention.

FIG. 2b schematically depicts optical line segments 1'-2', 2'-3', 3'-4', 4,-5', 5'-6', 7'-8', 9'-10', derived therefrom.

Figure 2C:
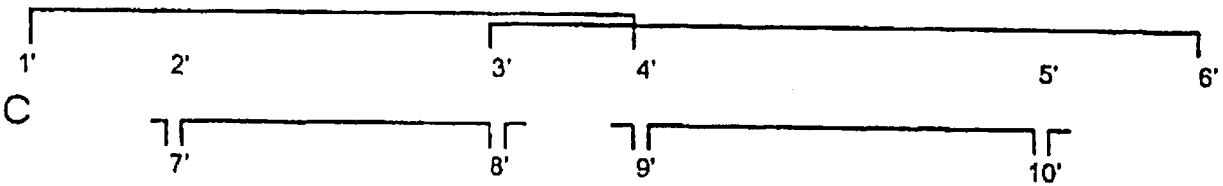
FIG. 2c depicts a first configuration of test segments arising from the second embodiment according to the present invention.

FIG. 2c depicts the test segments of the arrangement according to FIG. 2a for the undisturbed case.

From the above rules, it can be seen that a line segment can belong to a plurality of test segments, as is demonstrated also in FIG. 2c for line segment 3'-4'. The test segments in FIG. 2c are line segments 1'-4', 3'-6', 7'-8', and 9'-10'. The active transmission takes place on line segments 1'-2'-3'-4'-5'-6'. Line segments 7'-8' and 9'-10' represent initially passive alternative line paths.

If a disturbance resulting from the failure of the test signal is established on normal line 1'-4', then a switchover is caused, which is depicted in FIG. 3d. Segment 2'-3' is passively connected and the active transmission now takes place on alternative line path 7'-8' from circuit point 1' to line point 4'. Other alternative line path 9'-10', in this case, is not needed as an alternative line path, and is therefore not made active. The test segments now run from 1' to 4' via line points 7' and 8', on the one hand, and from 8' via 4', 5' to line point 6', on the other hand. In addition, passive paths 2'-3' and 9'-10' are tested for the preservation or reinstatement of functionality.

Figure 2D:
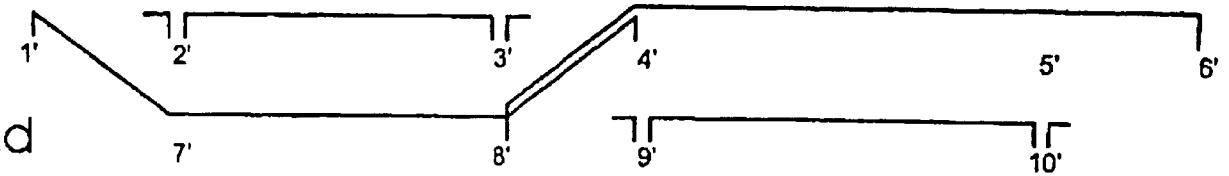
FIG. 2d depicts a second configuration of the test segments arising from the second embodiment according to the present invention.

From FIG. 2d, it clear that on the basis of the present invention, only a truly necessary alternative line path is actively connected and that this active connection is achieved through the depicted formation of test segments and the testing of test signals at the ends of the test segments. The comparison of FIGS. 2c and 2d also makes it clear that, in the normal case, test signal nodes (LS7', LS8'), functioning as inception nodes, are connected as transit nodes, and that test signal node LS2', originally connected as a transit node, is connected as an inception node, if a new configuration is required, e.g., in accordance with FIG. 2d, opposite FIG. 2c. For test signal nodes LS3', LS4', located on overlapping test segments, one configuration is possible as a transit node in one direction and as an inception node in the other direction.

As a result of the present invention, it is assured that a switchover to an alternative line path only occurs if a switchover of that type can also be expedient. If, for example, in the configuration according to FIG. 1a, a disturbance is detected on line path 2-3, then the entire optical path 1-6 is unusable. If, subsequently, yet another disturbance is detected on line path 4-5, a switchover to alternative line path 7-10 would be completely pointless, because this switchover would not lead to a usable optical path 1-6. In many configurations, alternative line path 7-10 is used entirely or partially for other purposes, for example, to carry out a communication having a lower priority or to share in the protection of another normal line path (Shared Protection). This secondary function of alternative line path 7-10 would have to be interrupted if the switchover from normal line path 4-5 to alternative line path 7-10 were undertaken, although as a result nothing would be achieved for the transmission on optical path 1-6. To avoid unnecessary switchovers of this type by test signal nodes LSX, test signals of at least two types are transmitted, and according to an exemplary embodiment according to the present invention that is also represented in greater detail below, test signals of three types, namely, LS-HOT, e.g., as bit pattern 1010

LS-COLD, e.g., as bit pattern 0101

LOLS all other bit patterns.

Test signal nodes LSX are also furnished with test signal receivers, which include a test signal level detector, so that the absence of a test signal—of whatever type—is recognized as an individual state. Test signal nodes LSX can therefore distinguish four states on the receiving side, namely, "test signal not present" and "test signal received," specifically corresponding to the three possible types of received test signal.

The test signals for the control of switchovers or of other protective measures are utilized according to the present invention on the basis of the rules elaborated below.

In the error-free state, test signal LS-HOT is transmitted on the entire optical path. If, within one line segment, for example, line segment 2-3 in FIG. 1a, a fault is recognized as a result of the fact that, for example, test signal node LS2 is no longer receiving a test signal, for example, caused by a fiber interruption for the transmission direction from test signal node LS3 to test signal node LS2, then the test signal node that is configured as illustrated in FIG. 1c as generally a transit node transmits an LOLS test signal in both directions.

If the test signal failure on line segment 2-3 were to occur in the other transmission direction, i.e., if it were detected by test signal node LS3 which is configured as an inception node, then the latter would transmit the LOLS test signal only in the reverse direction, i.e., in the direction of test signal nodes LS2 and LS1.

At the ends of line path 1-3, i.e., at test signal nodes LS1 and LS3, a direct transition from test signal LS-HOT to test signal LOLS is detected, so that at these locations a switchover to an alternative line path could be undertaken if an alternative line path of this type were available (as is the case in the exemplary embodiment illustrated in FIG. 2a for normal line path 2'-3' through alternative line path 7'-8').

On the basis of the disturbance arising in line path 2-3 in the exemplary embodiment depicted in FIG. 1a, on all other line paths 1- 2, 4-5, 5-6 of the optical path (in this situation, potential alternative line paths 7-8, 9-10 are not connected and therefore do not belong to the present optical path 1-6), test signals of the second type LS-COLD are transmitted. If the loss of the test signal were to be detected, for example, by test signal node 5 on the basis of a disturbance, it would not result in a switchover to alternative line path 7-10 because the switchover would only be effected if a transition from test signal LS-HOT to test signal LOLS took place, which, however, cannot occur due to the transmission of test signal LS-COLD.

The transmission of test signal LS-COLD, which, in this way, prevents a switchover to alternative line path or other protective measures, can also be controlled from outside, for example, by a coupling node computer, in order to avoid inadvisable switchover reactions in the event of a foreseeable short-term disturbance. This is advantageous, for example, if in an existing network configuration a new transmission path for useful signals (for example, a new wavelength channel) is constructed or an existing transmission path is dismantled, since, in this context, it is possible that short-term disturbances of existing transmission paths can occur. By supplying LS-COLD test signals to the optical path, potentially existing alternative path circuits are "frozen," until the new operating state is reliably established. As a result, "chain reactions," as a result of switchovers arising one after the other, can also be avoided. In addition, for purposes of servicing, an existing network configuration can be "frozen," without having to dismantle protective mechanisms configured, for example, by a central computer.

Figure 3:
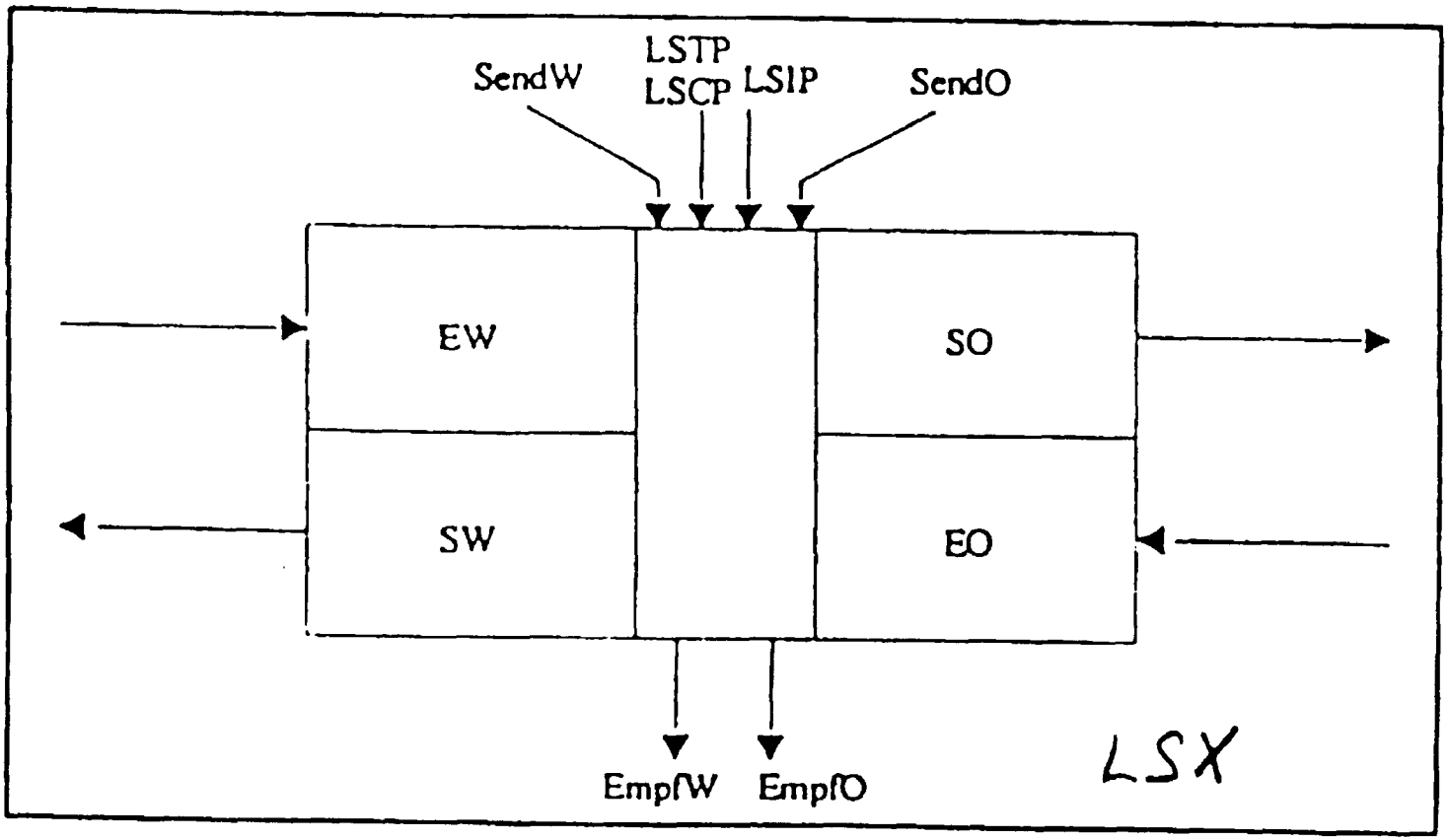
FIG. 3 depicts a simplified schematic representation of a test signal node according to the present invention.

FIG. 3 schematically depicts the design of the test signal node for a bidirectional network, in which separated fiber-optic lines are provided for both transmission directions. Test signal node LSX has two transit sides (E, O) for connected line segments. A test signal from side E is received by a test signal receiver EW. A test signal can be transmitted from a test signal transmitter SW to side E. Correspondingly, for transit side O, a test signal receiver EO and a test signal transmitter SO are provided.

In the depicted exemplary embodiment, test signal node LSX also has four inputs from superordinate control systems. Via an input SendW, a test signal to be transmitted by test signal transmitter SW can be input from outside. The same applies for an input SendO, which establishes from outside a test signal to be transmitted by test signal transmitter SO.

At a further input LSTP, LSCP, a configuration signal is input for test signal node LSX, through which it is established whether test signal node LSX is configured as a transit node (LSCP) or as an inception node (LSTP).

If test signal node LSX is an end node of an optical path (e.g., LS1 and LS6 in FIG. 1a), it is only used as an end node (LSIP) for one side E or O. This configuration is controlled through an input LSIP. The test signals received from test signal node LSX are output as test signal information via outputs EmpfW, EmpfO to a superordinate control system, for example, a coupling node computer, so that the coupling node computer can undertake evaluations for the purpose of the switchover to protective measures, the worse state of SO and EO being transmitted on EmpfO and the worse state of SW and EW being transmitted on EmpfW.

If test signal node LSX is in the configuration as a transit node (LSCP), the received test signals are retransmitted unchanged (EW=SO; EO=SW). Only if a test signal is not received, for example, at test signal receiver EW, is signal LOLS transmitted in both directions by test signal transmitters SO, SW.

If test signal node LSX is configured as an inception node (LSTP), then in response to the failure of reception of a test signal, for example, at test signal receiver EW, it transmits signal LOLS only in the corresponding reverse direction (SW), regularly transmitting the signal (LS-COLD) in the other direction, however, unless the transmission of a worse test signal (LOLS) is indicated by a test signal from the other direction. Test signal node LSX, receiving signal LOLS transmitted by test signal transmitter SW, and configured as an inception node (LSCP), at the end of the line path that is disturbed in the other transmission direction, regularly transmits signal LS-COLD in the W direction in response to the reception of LOLS, so that all line paths not affected by the disturbance transmit signal LS-COLD in the W transmission direction. Test signal nodes LSX, which as inception nodes (LSTP) receive a signal LS-COLD, transmit signal LS-HOT in the opposite direction, if non-corresponding test signal receiver EW simultaneously registers a loss of a test signal, so that corresponding test signal transmitter SO transmits an LS-COLD test signal.

On the basis of the rule that, in the reverse direction, test signal transmitter SO or SW fundamentally transmits a test signal of a higher order (failure test signal LOLS; LOLS LS→COLD; LS→COLD LS→HOT, assuming an end node (LSIP) is present or LS-HOT has been received on transmitter side), a rapid and automatic reconnection of the normal line paths is permitted after the carrying out of a line repair.

Figure 4:
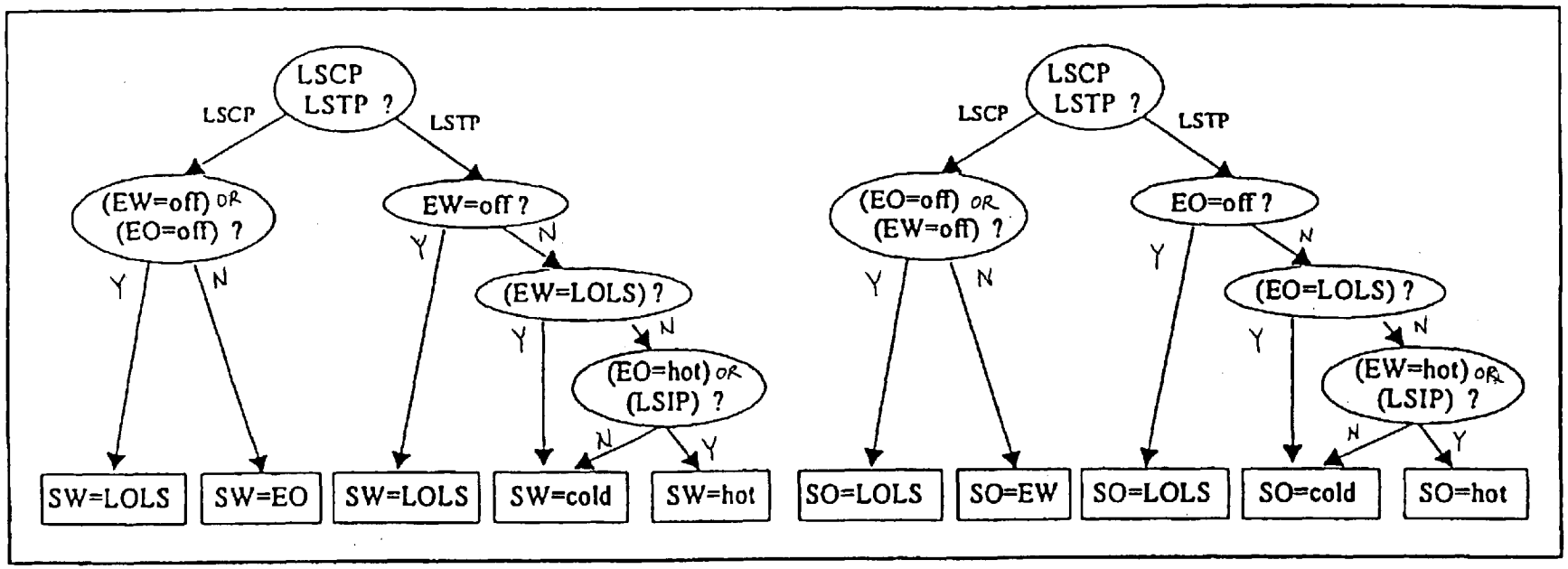
FIG. 4 depicts a flowchart illustrating the formation of test signals for a test signal transmitter of a test signal node according to the present invention.

FIG. 4 depicts a flow diagram for the generation of the test signals to be transmitted via test signal transmitters SO, SW as a function of the test signals received by test signal transmitters EW, EO.

For a transit node (LSCP), it only remains to be tested whether one of test signal receivers EW or EO signals a test signal failure ("off") or not. If a test signal failure is established, then signal LOLS is transmitted in both directions. If both test signal receivers EW, EO have received a test signal, then the received test signal is once again transmitted unchanged (SW=EO; SO=EW).

If, on the other hand, test signal node LSX is an inception node (LSTP; an end node (LSIP) is a subcase of an inception node (LSTP)), then in response to an established test signal failure (for example, EW=off) signal LOLS (SW=LOLS) is transmitted in the opposite direction. The same applies if the test signal failure is established by other test signal receiver EO. In this case, test signal LOLS is transmitted by test signal transmitter SO.

If a test signal is received by test signal receiver EW, EO, and if this test signal is LOLS, then in accordance with the above rule, test signal LS-COLD (SW=cold or SO=cold) is transmitted in the opposite direction.

If the received test signal is not LOLS, then it can only be LS-COLD or LS-HOT. If the input signal of the other side is LS-HOT or if the test signal node is an end node (LSIP), then test signal LS-HOT is transmitted in the opposite direction, otherwise LS-COLD.

The bit patterns cited above as examples for test signals LS- HOT and LS-COLD have an advantage in that it is very difficult to confuse the two test signals.

The control system for the protective measures may be set such that in state LS-HOT only a small number of other bit patterns (LOLS) suffice to send an alarm to the control computer. In state LS-COLD, an alarm is reported only after a much larger number of falsely received test signal bit patterns. In this manner, it can be avoided that, in state LS-COLD, failures lasting briefly lead to an alarm in the central control system of the network.

If the transmission capacity of the test signal channel is selected so as to be sufficiently large, e.g., two MBit/s, then in addition to the test signals described here, other data for controlling and monitoring can also be transmitted independent of the test signals themselves.

For the test signal concept according to the present invention, it is not important how many wavelengths are transmitted simultaneously over one optical fiber, for example, in wavelength division multiplexing, because each wavelength channel has assigned to it its own test signal. Each wavelength can therefore be protected by its own alternative line path.

The protective measures depicted, according to the present invention, are locally controlled, for example, by the coupling node computer, so that the central control system of the network and the operator do not participate in acute switchover measures.

What is claimed is:

1. A method for transmitting useful optical signals, comprising the steps of:

providing an optical transmission device between a first transceiver and a second transceiver, the first transceiver including at least one of a first signal source and a first signal sink, the second transceiver including at least one of a second signal source and a second signal sink, the optical transmission device including at least one normal segment and at least one alternative segment, the at least one normal segment and the at least one alternative segment running parallel;

intercoupling the at least one normal segment, the at least one alterative segment, the first transceiver and the second transceiver via at least two coupling nodes;

generating, receiving and recognizing optical test signals section by section via at least four test signal nodes, the optical test signals being in addition to the useful optical signals and including at least a first of the optical test signals, a second of the optical test signals and a third of the optical test signals, the third one including the optical test signals that are not of the first one and not of the second one, the at least four test signal nodes including at least two test signal nodes and at least two additional test signal nodes, the at least two test signal nodes being arranged at ends of the at least one normal segment, the at least two additional test signal nodes being arranged at ends of the at least one alternative segment;

transmitting the optical test signals via the optical transmission device;

detecting a disturbance of the optical transmission device by receiving the third one via a test signal node of the at least four test signal nodes; and switching over between the at least one normal segment and the at least one alternative segment via the at least two coupling nodes, wherein the step of switching over between the at least one normal segment and the at least one alternative segment includes the step of switching over from a particular normal segment to a particular alternative segment via a particular coupling node, the particular coupling node being coupled to a closest test signal node of the particular normal segment via a control unit, and wherein the step of switching over from the particular normal segment to the particular alternative segment occurs when, before receiving the optical test signal of the third one, the closest signal node of the particular normal segment receives the optical test signal of the first one.

2. The method according to claim 1, further comprising the step of:

configuring the at least four test signal nodes as at least one of transit nodes, inception nodes and end nodes.

3. The method according to claim 1, further comprising the steps of:

providing the optical transmission device with at least one segment, the at least one segment including the at least one normal segment and the at least one alternative segment;

recognizing the disturbance of a particular segment of the at least one segment; and transmitting the optical test signal of the second one on all segments of the at least one segment excluding the particular segment.

4. The method according to claim 1, further comprising the step of:

transmitting the optical test signals by the test signal node as a function of the optical test signals received by the test signal node.

5. The method according to claim 4, further comprising the step of:

influencing, via a superordinate control, the transmitting of the optical test signals by the test signal node.

6. The method according to claim 4, further comprising the step of:

configuring the test signal nodes via a superordinate control.

7. The method according to claim 4, further comprising the step of:

supplying information, via the test signal nodes to a superordinate control, relating to the optical test signals received by the test signal node.

8. The method according to claim 7, further comprising the step of:

using a coupling node that adjoins the test signal node as a superordinate control.

9. The method according to claim 1, wherein the transmitting of useful optical signals is accomplished bidirectionally.

10. The method according to claim 9, wherein the bidirectionally transmitting of useful optical signals includes the step of using separate optical line fibers for bidirectionally transmitting useful optical signals.

11. The method according to claim 1, wherein the step of transmitting the optical test signals includes the step of bidirectionally transmitting the optical test signals.

12. The method according to claim 10, further comprising the step of:

transmitting the optical test signals in both transmission directions together with transmitting the useful optical signals in a particular direction.

13. The method according to claim 12, further comprising the steps of:

transmitting a multiplicity of useful signals via a multiplex operation on each segment of the optical transmission device in each direction; and assigning to each transmitted useful signal its own optical test signal.

14. The method according to claim 13, further comprising the steps of:

detecting a state "test signal not present" using a test signal level detector of the test signal node in response to an undershooting of a level of the optical test signal; and transmitting the third test signal type by the test signal node in at least one direction.

15. An optical network, comprising:

a first transceiver, the first transceiver including at least one of a first signal source and a first signal sink;

a second transceiver, the second transceiver including at least one of a second signal source and a second signal sink;

an optical transmission device including at least one normal segment and at least one alternative segment, the optical transmission device being arranged between the first transceiver and the second transceiver, the at least one normal segment and the at least one alternative segment running parallel;

at least two coupling nodes intercoupling the at least one normal segment, the at least one alternative segment, the first transceiver and the second transceiver, the at least two coupling nodes being adapted such that the at least one normal segment is bypassed by a switchover of the at least two coupling nodes to the at least one alternative segment; and at least four test signal nodes disposed at ends of the at least one normal segment and disposed at ends of the at least one alternative segment, the at least four test signal nodes including a test signal generator and a test signal receiver, the test signal generator generating at least a first test signal, a second test signal and a third test signal, the third test signal including all signals that are not the first signal and not the second signal, the test signal receiver receiving the first test signal, the second test signal and the third test signal for recognition, wherein a particular coupling node of the at least two coupling nodes switches over between the at least one normal segment and the at least one alternative segment if, by the test signal receiver of a closest test signal node in connection with the particular coupling node, the third test signal is detected in connection with the first test signal.

16. The optical network according to claim 15, wherein the at least four test signal nodes include the test signal receivers and the test signal generators in both line directions.

17. The optical network according to claim 15, further comprising:

a superordinate control system configuring the at least four test signal nodes as at least one of transit nodes, inception nodes and end nodes.

18. The optical network according to claim 17, wherein the at least four test signal nodes include signal connections to the superordinate control system.

19. The optical network according to claim 18, wherein the superordinate control system controls the test signal generators via the signal connections.

20. The optical network according to claim 19, wherein the superordinate control includes a part of an adjoining coupling node of the at least two coupling nodes.

21. The optical network according to claim 15, wherein the test signal receiver includes a test signal level detector, the test signal level detector detecting an undershooting of a threshold level of the test signal as a state "test signal not present," thereupon the test signal node transmitting the third test signal in at least one direction.

*22. An apparatus comprising:*

*a first optical communications receiver to receive one of at least three different test signals;*

*a second optical communications receiver to receive one of at least three different test signals;*

*a first optical communications transmitter to transmit one of at least three different test signals; and*

*a second optical communications transmitter to transmit one of at least three different test signals,*

*wherein a first of said at least three different test signals is to indicate a first status of an optical channel to which the apparatus is to be coupled, a second of said at least three different test signals is to indicate a second status of the optical channel to which the apparatus is to be coupled, and a third of said at least three different test signals is to indicate a status of the optical channel to which the apparatus is to be coupled that is not said first status and not said second status, and*

*wherein said first optical communications receiver and first optical communications transmitter are to be coupled to a common side of a first optical channel, and wherein said second optical communications receiver and second optical communications transmitter are to be coupled to a common side of a second optical channel.*

*23. The apparatus according to claim 22, further comprising at least one input to receive an externally-generated test signal.*

*24. The apparatus according to claim 22, further comprising at least one configuration input to receive at least one control signal to determine a role of the apparatus within a network.*

*25. The apparatus according to claim 22, further comprising at least one test signal output to output a received test signal.*

*26. A method comprising:*

*at a node of a communication network, upon failure to receive a test signal from a first communication channel, transmitting a second test signal to indicate a changed status of the first communication channel, wherein said second test signal is to indicate a test signal failure, and wherein, if the node is configured as a transit node between said first communication channel and a second communication channel, the second test signal is transmitted on said first communication channel and on said second communication channel, and if the node is configured as an inception node, the second test signal is transmitted only over a second communication channel to which the node is coupled; and*

*upon receiving a test signal from said first communication channel, retransmitting the test signal over the second communication channel if the node is configured as a transit node.*

*27. A method comprising:*

*providing a transmission device between a first transceiver and a second transceiver, the first transceiver including at least one of a first signal source and a first signal sink, the second transceiver including at least one of a second signal source and a second signal sink, the transmission device including at least one normal segment and at least one alternative segment, the at least one normal segment and the at least one alternative segment running parallel;*

*intercoupling the at least one normal segment, the at least one alterative segment, the first transceiver and the second transceiver via at least two coupling nodes;*

*generating, receiving and recognizing test signals section by section via at least four test signal nodes, the test signals being in addition to useful communication signals and including at least a first of the test signals, a second of the test signals and a third of the test signals, the third one including the test signals that are not of the first one and not of the second one, the at least four test signal nodes including at least two test signal nodes and at least two additional test signal nodes, the at least two test signal nodes being arranged at ends of the at least one normal segment, the at least two additional test signal nodes being arranged at ends of the at least one alternative segment;*

*transmitting the test signals via the transmission device;*

*detecting a disturbance of the transmission device by receiving the third one via a test signal node of the at least four test signal nodes; and*

*switching over between the at least one normal segment and the at least one alternative segment via the at least two coupling nodes, wherein the step of switching over between the at least one normal segment and the at least one alternative segment includes the step of switching over from a particular normal segment to a particular alternative segment via a particular coupling node, the particular coupling node being coupled to a closest test signal node of the particular normal segment via a control unit, and wherein the step of switching over from the particular normal segment to the particular alternative segment occurs when, before receiving the test signal of the third one, the closest signal node of the particular normal segment receives the test signal of the first one.*

*28. The method according to claim 27, further comprising:*

*configuring each of the at least four test signal nodes as at least one type of node selected from the group consisting of transit nodes, inception nodes and end nodes.*

*29. The method according to claim 27, further comprising:*

*providing the transmission device with at least one segment, the at least one segment including the at least one normal segment and the at least one alternative segment;*

*recognizing the disturbance of a particular segment of the at least one segment; and*

*transmitting the test signal of the second one on all segments of the at least one segment excluding the particular segment.*

*30. The method according to claim 27, further comprising:*

*transmitting the test signals by the test signal node as a function of the test signals received by the test signal node.*

*31. The method according to claim 27, further comprising:*

*applying a superordinate control to at least one test signal node.*

*32. The method according to claim 27, wherein the transmitting of useful signals is accomplished bidirectionally.*

*33. The method according to claim 27, wherein said transmitting the test signals includes bidirectionally transmitting the optical test signals.*

*34. A communication network, comprising:*

*a first transceiver, the first transceiver including at least one of a first signal source and a first signal sink;*

*a second transceiver, the second transceiver including at least one of a second signal source and a second signal sink;*

*a transmission device including at least one normal segment and at least one alternative segment, the transmission device being arranged between the first transceiver and the second transceiver, the at least one normal segment and the at least one alternative segment running parallel;*

*at least two coupling nodes intercoupling the at least one normal segment, the at least one alternative segment, the first transceiver and the second transceiver, the at least two coupling nodes being adapted such that the at least one normal segment is bypassed by a switchover of the at least two coupling nodes to the at least one alternative segment; and*

*at least four test signal nodes disposed at ends of the at least one normal segment and disposed at ends of the at least one alternative segment, the at least four test signal nodes including a test signal generator and a test signal receiver, the test signal generator generating at least a first test signal, a second test signal and a third test signal, the third test signal including all signals that are not the first signal and not the second signal, the test signal receiver receiving the first test signal, the second test signal and the third test signal for*

*recognition, wherein a particular coupling node of the at least two coupling nodes switches over between the at least one normal segment and the at least one alternative segment if, by the test signal receiver of a closest test signal node in connection with the particular coupling node, the third test signal is detected in connection with the first test signal.*

*35. The network according to claim 34, wherein the at least four test signal nodes include the test signal receivers and the test signal generators in both line directions.*

*36. The network according to claim 34, further comprising:*

*a superordinate control system to configure at least one of the at least four test signal nodes as at least one type of node selected from the group consisting of transit nodes, inception nodes and end nodes.*

* * * * *